United States Patent
Vincent

(10) Patent No.: US 8,938,571 B1
(45) Date of Patent: Jan. 20, 2015

(54) MANAGING I/O OPERATIONS IN A VIRTUALIZED ENVIRONMENT

(75) Inventor: Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 227 days.

(21) Appl. No.: 13/495,708

(22) Filed: Jun. 13, 2012

(51) Int. Cl.
*G06F 12/00* (2006.01)

(52) U.S. Cl.
USPC ............... 711/6; 711/162; 711/206; 711/207; 709/250; 710/22; 710/118; 370/429; 370/474

(58) Field of Classification Search
USPC ....................... 711/6, 162, 206, 207; 709/250; 370/429.474
See application file for complete search history.

Primary Examiner — Mardochee Chery
(74) Attorney, Agent, or Firm — Novak Druce Connolly Bove + Quigg LLP

(57) ABSTRACT

A set of techniques is described for performing input/output (I/O) between a guest domain and a host domain in a virtualized environment. A pool of memory buffers is reserved for performing virtualized I/O operations. The reserved pool of memory buffers has static mappings that grant access to both the guest domain and the host domain. When a request to perform an I/O operation is received, the system can determine whether the memory buffers allocated to the I/O operation belong to the reserved pool. If the buffers are in the reserved pool, the host domain executes the I/O operation using the buffers without the need to map/unmap the buffers and perform TLB flushes. If the buffers are not in the reserved pool, the system can either copy the data into the reserved pool or perform the mapping and unmapping of the memory buffers to the address space of the host domain.

26 Claims, 7 Drawing Sheets

MANAGING I/O OPERATIONS IN A VIRTUALIZED ENVIRONMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In this context, many cloud computing providers utilize virtualization to allow multiple users to share the underlying hardware and/or software resources. Virtualization can allow computing servers, storage device or other resources to be partitioned into multiple isolated instances that are associated with (e.g. owned by) a particular user. In many cases, the underlying technology used to enable virtualization utilizes memory sharing mechanisms or other tools to communicate information between these isolated instances or virtual machines. For example, input/output (I/O) virtualization provides a way to abstract the guest operating systems and other upper layer protocols from the physical connections with the hardware. However, while virtualized I/O is useful in shared and secured environments, it often tends to suffer from performance problems, such as low throughput, high latency and high latency jitter.

BRIEF DESCRIPTION OF THE DRAWINGS

Various embodiments in accordance with the present disclosure will be described with reference to the drawings, in which.

DETAILED DESCRIPTION

Figure 1:
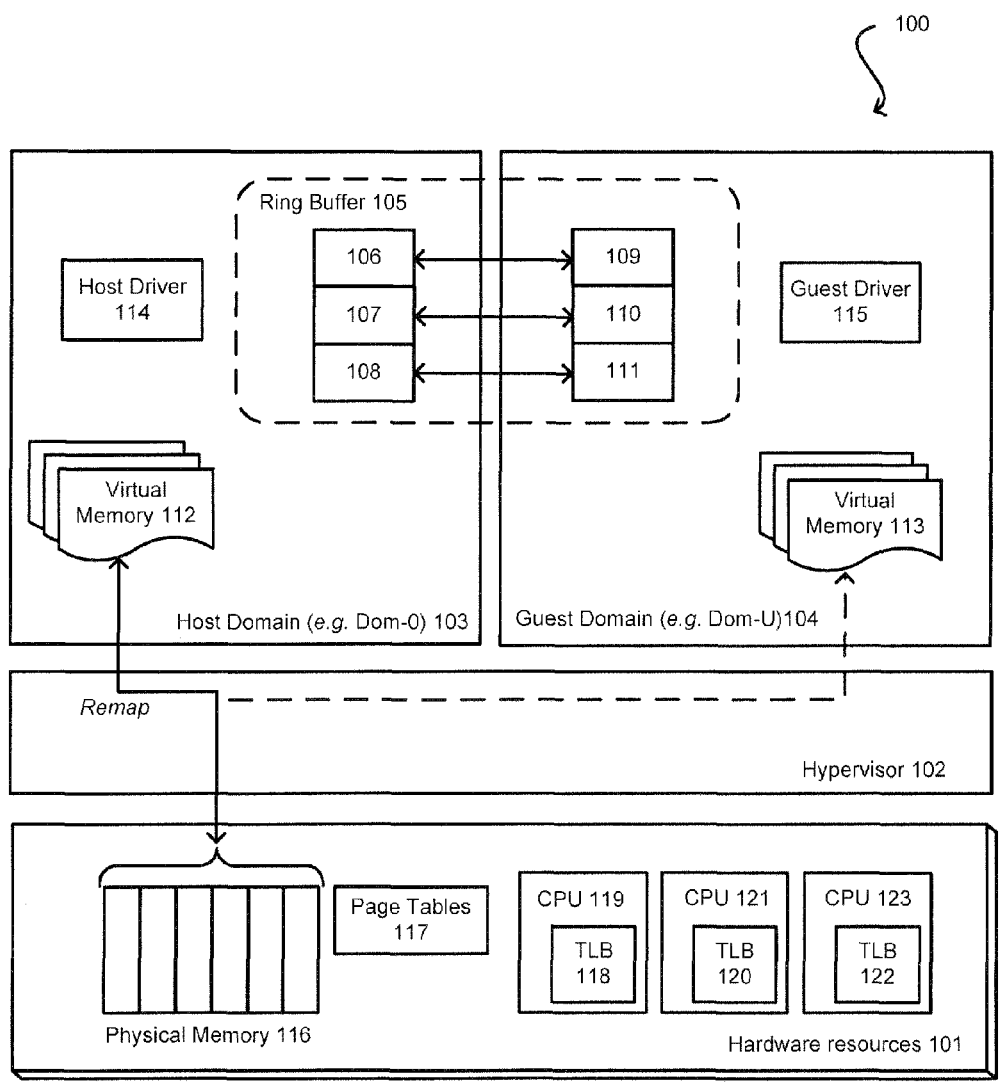
FIG. 1 illustrates an example of a virtualized computing environment in which input and output operations can be performed, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for performing operations in a virtualized computing environment. In particular, various embodiments provide approaches for reserving a pool of memory (e.g. statically mapped pool of memory buffers) to perform virtualized input/output (I/O) operations between a guest domain and a host domain in the virtualized environment.

In accordance with various embodiments, one such approach involves a virtualized computing system that includes a hypervisor, a host domain and one or more guest domains that share underlying hardware resources. In accordance with an embodiment, upon initialization of a particular device driver in the guest domain, the guest driver requests the hypervisor to allocate a pool of memory buffers for performing I/O operations on that hardware device. Once the pool of memory is allocated, it can be locked into memory to prevent swap and access to the pool can be provided to the host domain. The host domain can map the pool of memory into its own memory address space such that the host domain is enabled to access the same pool of memory buffers.

In various embodiments, when the guest kernel I/O stack requests buffers for an I/O operation, it may indicate to the memory management layer various information about which device the particular I/O operation will be destined to. For example, the guest kernel may indicate the device type, device number, device object address and the like. In accordance with an embodiment, the memory management system can then determine whether to allocate memory buffers to the I/O operation from the specifically reserved pool or from regular memory pools.

In accordance with an embodiment, when the guest driver is requested to perform the I/O operation, the guest driver can check whether the memory buffers allocated belong to the reserved memory pool. In an alternative embodiment, the memory management system can indicate to the guest driver that the memory buffers are from the reserved pool.

In accordance with an embodiment, if the memory buffers are determined to be from the reserved memory pool, the guest driver can skip the hypercall to grant memory access to the host domain and can instead indicate to the host domain that the buffers allocated for this I/O operation are in the reserved memory pool. This indication may be provided by passing I/O metadata over the ring buffer between the guest driver and the host driver. If the allocated memory buffers are not from the reserved memory pool, the system can either (a) copy the allocated memory buffers into the reserved pool of memory buffers; or (b) proceed to request the hypervisor to create new mappings for the allocated buffers in order to enable the host domain access to the allocated buffers.

In accordance with an embodiment, when the host driver receives the I/O operation request, the host driver determines that the memory buffer belongs to the specifically reserved memory pool and the host driver uses the existing static mapping to perform the I/O instead of initiating new mappings for the memory buffers. Once the I/O operation is completed, the guest driver may release the memory buffers to replenish the reserved memory pool.

FIG. 1 illustrates an example of a virtualized computing environment 100 in which input and output operations are performed, in accordance with various embodiments.

In accordance with the illustrated embodiment, the virtualized environment 100 includes a set of hardware 101, a hypervisor 102, a host domain 103 and one or more guest domains 104. The hypervisor 102 manages the execution of the one or more guest operating systems and allows multiple instances of different operating systems to share the underlying hardware resources 101. Conventionally, hypervisors are installed on server hardware, with the function of running guest operating systems, where the guest operating systems themselves act as servers. In various embodiments, there can be at least two types of hypervisor 102: a type 1 (bare metal) hypervisor; and a type 2 (hosted) hypervisor. A type 1 hypervisor runs directly on the hardware resources 101 and manages and controls one or more guest operating systems, which run on top of the hypervisor. A type 2 hypervisor is executed within the operating system and hosts the one or more guest operating conceptually at a third level above the hardware resources 101.

In accordance with an embodiment, the hypervisor 102 can host a number of domains (e.g. virtual machines), such as the host domain 103 and one or more guest domains 104. In one embodiment, the host domain 103 (e.g. Dom-0) is the first domain created and manages all of the other domains running on the hypervisor 102. For example, the host domain 103 can manage the creating, destroying, migrating, saving, or restoring the one or more guest domains 104 (e.g. Dom-U). In accordance with various embodiments, the hypervisor 102 controls access to the hardware resources such as the CPU, input/output (I/O) memory and hypervisor memory.

In accordance with the illustrated embodiment, the guest domain 103 includes one or more virtualized or paravirtualized drivers 115 and the host domain includes one or more physical device drivers 114. When the guest domain wants to invoke an I/O operation, the virtualized driver 115 may perform the operation by way of communicating with the physical device driver 114. When the guest driver 115 wants to initiate an I/O operation (e.g. sending out a network packet), a guest kernel component will identify which physical memory buffer contains the packet (or other data) and the guest driver 115 will either copy the memory buffer to a temporary storage location in the kernel for performing I/O or obtain a set of pointers to the memory pages that contain the packet(s). In one embodiment, the guest driver 115 will place the pointers into a data structure that is part of the ring buffer 105.

In various embodiments, the ring buffer is a set of statically mapped memory pages that are shared between the guest domain 104 and the host domain 103. These virtual pages can be linked to the same physical addresses, and they can be used as the primary channel to pass metadata and pointers associated with network packets or I/O operations. The ring buffer 105 serves as the core of front-to-back communication of a paravirtualized driver, such as driver 115. Conceptually, the ring buffer 105 can be thought of as containing a number of slots (106, 107, 108, 109, 110, 111), wherein each slot is a data structure that corresponds to an I/O operation. Each I/O operation may be associated with data from multiple memory pages. Accordingly, each data structure in the ring buffer contains a set of pointers to the memory pages for the I/O operation, as well as any metadata associated with the I/O operation.

In accordance with an embodiment, when the guest driver 115 submits an I/O operation, one of the data structures is filled out and placed into the ring buffer 105 and the host driver 114 is then notified that the I/O operation has been submitted. At this point, either the guest driver 115 or the host driver 114 (or both) may need to initiate one or more hypervisor calls to set up the grant table mechanism so that the host driver can obtain access to the data in the memory pages 113 associated with the I/O operation that has been submitted. For example, the guest domain may indicate to the hypervisor which physical memory pages 116 contain the data for the I/O operation and requests the hypervisor to grant the host domain access to those memory pages 116. The host domain then retrieves the pointers to the memory pages from the ring buffer 105 and request access to those memory pages 116 from the hypervisor. The access can be provided by either copying the data from the shared buffer into the host domain specific buffer or by performing a virtual to physical remapping of the memory buffers, where the host domain gives one or more virtual addresses 112 from its own virtual space and requests the hypervisor to perform the remapping of the physical memory pages 116 to the virtual addresses 112 of the host domain. The hypervisor 102 then performs the remapping of the physical memory 116 from the virtual address space of the guest domain into the virtual address space 112 of the host domain. Once this remapping is performed, the host domain can have access to the memory pages 116 that contain the data for the I/O operation. The host domain driver can then perform the I/O operation and once the operation is complete, the memory pages can be unmapped.

In accordance with an embodiment, one reason for low performance of virtualized I/O stack is that guest memory buffers which are part of an I/O operation may need to be mapped into host domain's memory during the I/O operation and then unmapped, as previously described. The mapping and unmapping operation can be fairly expensive as it involves multiple hypercalls, hypervisor memory management activities, host domain memory management activities and/or Transaction Lookaside Buffer (TLB) flush activities. On the other hand, fully mapping the guest memory into the host domain is usually not a feasible solution. If the guest memory were to be fully mapped into host domain, then hypervisor security and isolation paradigms would be compromised since it may be much easier for the host domain to corrupt guest memory inadvertently or maliciously.

In accordance with various embodiments, a TLB is a cache containing memory addresses, which memory management hardware uses to improve the speed of translation of memory addresses. The TLB contains the mappings of various physical memory locations (e.g. addresses) to virtual memory locations. In accordance with an embodiment, each CPU (119, 121, 123) in the system is associated with its own TLB (118, 120, 122). In various embodiments, when the system needs to determine the physical address of a virtual memory location, it first inspects the TLB. If there is a TLB hit (e.g. the address is present in the TLB), the system can retrieve the physical address quickly and access the appropriate memory. If the requested address is not found in the TLB, the system will proceed to look up the address in the page tables data structure 117 by performing a page walk. Once the memory address is determined from the page tables, the virtual-to-physical address mapping can be entered into the TLB for future access.

In conventional virtual environments, when the hypervisor 102 performs the remapping of the physical memory 116 from the virtual address space 113 of the guest domain 104 into the virtual address space 112 of the host domain 104, the mapping change is often made visible to all of the CPUs (119, 121, 123) in the system. As a result, whenever the page table entries are changed in this manner, the TLBs on all host domain CPUs are usually flushed in order to prevent any CPU from having invalid memory address mappings. This operation can be quite expensive and adds to the overall latency and lower throughput caused by the various mapping/unmapping operations in virtualized environments.

Figure 2:
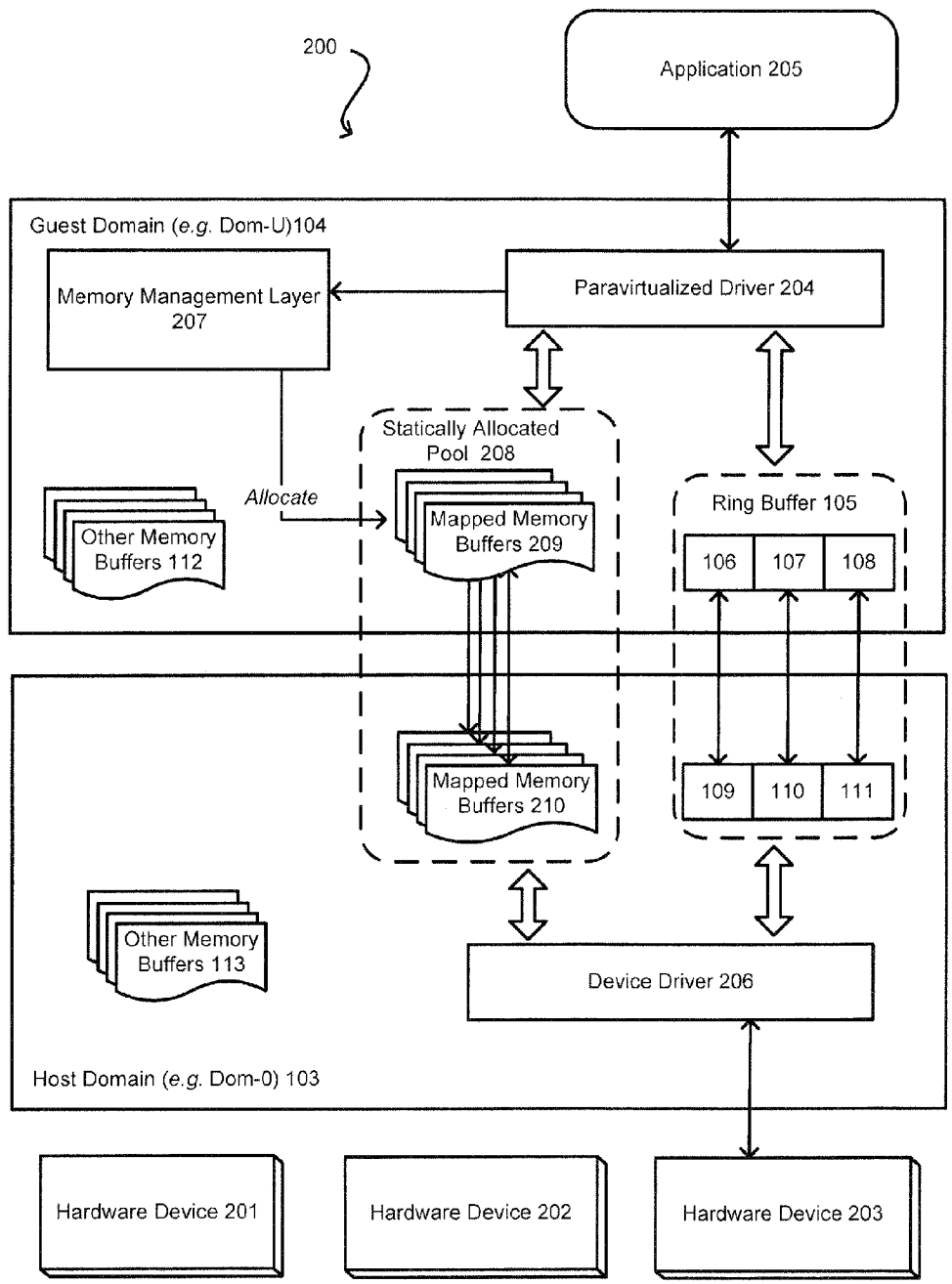
FIG. 2 illustrates an example of a virtualized environment where a pool of memory buffers is statically allocated for use by I/O operations, in accordance with various embodiments.

FIG. 2 illustrates an example of a virtualized environment 200 where a pool of memory buffers is statically allocated for use by I/O operations, in accordance with various embodiments.

In accordance with the illustrated embodiment, instead of mapping all of guest domain 104 memory to host domain (e.g. Dom-0) 103 permanently, the system can map a small portion of the guest memory pool into the host domain and use the memory pool for I/O operations. This statically mapped pool 208 of memory will be reserved for the purpose of performing paravirtualized I/O.

In accordance with an embodiment, when the paravirtualized driver 204 initializes itself inside the guest domain 104, the paravirtualized driver allocates a set of memory pages that the paravirtualized driver can share with the host domain 103 as the ring buffer 105. The ring buffer 105 is used as the primary channel to pass metadata about network packets or I/O operations, as previously described. In addition, the paravirtualized driver 204 calls a function in operating system (OS) memory management layer 207, requesting the memory management layer to allocate a semi-permanent pool of memory buffers 208 that can be used for I/O operations via the paravirtualized interface that is being initialized. In one embodiment, the function call includes parameters such as maximum queue depth, maximum I/O size, type of I/O (e.g. network/block etc.) as well as other hints such as expected latency to complete an I/O operation from memory buffer standpoint. The expected latency to complete an I/O operation is the amount of time the driver expects the buffers associated with an I/O operation to be held before the I/O is completed and buffers are released. In one embodiment, the reserved memory pool of buffers is specific to a particular device. In other embodiments, the pool is specific to the guest domain. In yet other embodiments, the pool may be shared by multiple device instances.

In accordance with an embodiment, once the memory management layer 207 allocates the pool of memory 208, the pool is then locked into memory (to prevent swap), full access is granted to the host domain 103 via hypervisor's memory sharing mechanism (e.g. Grant table mechanism in Xen) and passed to the host domain backend driver 206. The host domain driver 206 requests a full mapping of the memory pool into its own memory mapping and potentially creates its own data structure to help determine if a particular memory buffer belongs to the special memory pool 208 or not.

In accordance with an embodiment, when the guest kernel I/O stack requests buffers for an I/O operation, it can provide hints on what device the I/O operation might be heading to. For example, the hint may indicate the type of device, major device number, minor device number, and device object address. In one embodiment, device numbers are OS specific indices that identify devices and device object address is an OS specific handler that uniquely identifies a device. In some embodiments, not all the entries may be used as a hint. In other embodiments, I/O stack may not provide any hint at all.

In accordance with an embodiment, the memory management subsystem leverages the hints, internal rules as well as current state of memory buffers and allocates buffers from one of the special memory pools or from regular memory pool of the other memory buffers. A set of internal rules can be implemented to help the memory management make better decisions about which memory pool to allocate the memory from particularly when the hints are not sufficient. For example, if the I/O stack declares that the buffers are for a network packet but do not specify which network device, the internal rule might indicate that the memory buffers should come from eth0's (e.g. Ethernet port's) memory pool.

In accordance with an embodiment, when guest driver 204 is requested to perform an I/O operation, the guest driver checks if the memory buffers allocated belong to the special memory pool allocated to it by the memory management layer 207. Alternatively, the memory management could indicate to the I/O stack that the buffers are from a special pool allocated to a particular device which is then passed on to the device driver via I/O metadata (e.g. skb flags).

In accordance with an embodiment, if the guest driver 204 detects that the memory buffers come from the special pool allocated to it, then it skips the hypercall to grant memory access to the host domain 103 and flags this in the I/O metadata which is passed on as part of the I/O ring slots (106, 107, 108, 109, 110, 111) between frontend and backend paravirtualized drivers.

In accordance with an embodiment, when the backend driver (host device driver) 206 receives an I/O operation request, it checks the metadata flags to see if the buffer belongs to the special memory pool 208. Alternatively, it can check its own data structure to see if the memory buffer belongs to the special pool or not. If the memory buffer is from special memory pool, the backend driver 206 uses the existing mapping instead of initiating new memory mappings for the memory buffers.

In accordance with an embodiment, once the I/O operation is completed by the host device driver 206, the host driver indicates the completion to the frontend (guest) driver 204. If the buffers associated with the I/O were part of the special buffer pool 208, then no unmapping operation is performed. The frontend driver receives the I/O completion notification and releases the buffer to the memory management layer 207 which replenishes the special buffer pool 208.

In various embodiments, if there are multiple device instances (201, 202, 203) that are handled by the same frontend and backend drivers (204, 206), the memory pools could potentially be shared across all of the devices.

In some embodiments, special memory management APIs can be used inside the guest domain 104 for applications 205 that would like to use Direct I/O. For example, the application 205 could request that a particular set of pages be allocated from the special pool 208 for an I/O device. The application 205 can then use these special buffers for Direct I/O operations. Alternatively, the I/O layer in the guest OS and/or the device driver could copy the buffers sent from the application to buffers allocated from the special memory pool before using the buffers for paravirtualized I/O operations. Similar techniques can also be used for other OS layers such as Page cache.

In accordance with some embodiments, the reserved pool of memory buffers may be periodically remapped into different physical address space in order to reduce the likelihood that any malicious agents learn the location of the shared memory between the guest domain and the host domain. The timing of the remapping may be performed according to one or more security policies. In some embodiments, the remapping of the addresses may be randomized in order to further confuse such agents. For example, any potentially malicious actors that may be monitoring communications between a device driver and a virtual address and gathering information about those communications would have a more difficult time learning the shared memory patterns and performing other undesirable actions.

Figure 3:
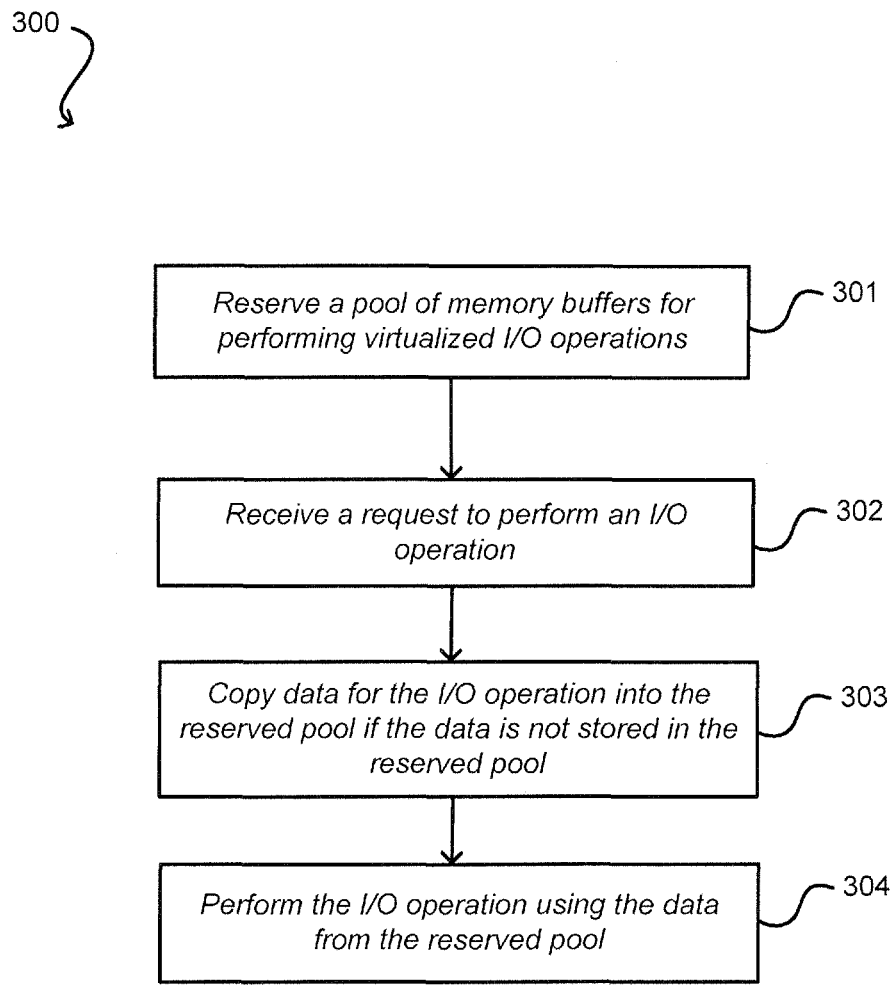
FIG. 3 illustrates an example process for using a reserved pool of memory buffers to perform virtualized I/O, in accordance with various embodiments.

FIG. 3 illustrates an example process 300 for using a reserved pool of memory buffers to perform virtualized I/O, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 301, the system reserves a pool of memory buffers specifically for performing virtualized I/O operations. In accordance with an embodiment, the reserved pool is mapped to both the address space of the host domain, as well as the guest domain so that both domains can share access to the memory buffers in the pool. For example, the mapping may be implemented by mapping the virtual addresses owned by the guest domain and the host domain to the same physical memory addresses. Once allocated, the reserved pool of memory buffers will be used to communicate data for performing I/O operations between the guest drivers and the host drivers. In at least one embodiment, the size of the memory pool for most types of devices can be associated with the amount of data that can be in flight for the particular device. In some embodiments, the size of the memory pool can be modified. For example, as new devices attach themselves to the guest or detach themselves from the guest, the size of the memory pool may be increased or decreased accordingly.

In operation 302, the system receives a request to perform an I/O operation. For example, the I/O request may be received from an application to a paravirtualized guest driver in the guest domain. As previously mentioned, the guest driver can work with the backend host driver in order to carry out the I/O operation by using the reserved pool of memory buffers.

In operation 303, the system copies the data for the I/O operation into the reserved pool of memory buffers. In one embodiment, the system can first check if the data is stored in the reserved memory pool, and if the data is already there, no copying is required. For example, if the memory management system specifically allocated the memory buffers from the reserved pool for the I/O operation, then the data for the I/O operation will already reside in the statically mapped pool. In other embodiments, the system may automatically copy the data into the reserved pool without any checking of where the data resides.

In operation 304, the system performs the I/O operation using the data from the reserved pool of memory buffers. In one embodiment, the host driver reads the data from the pool and performs the I/O operation (e.g. sending a network packet). Once the I/O operation is completed, the host driver may notify the guest driver to release the memory buffers in the reserved pool.

Figure 4:
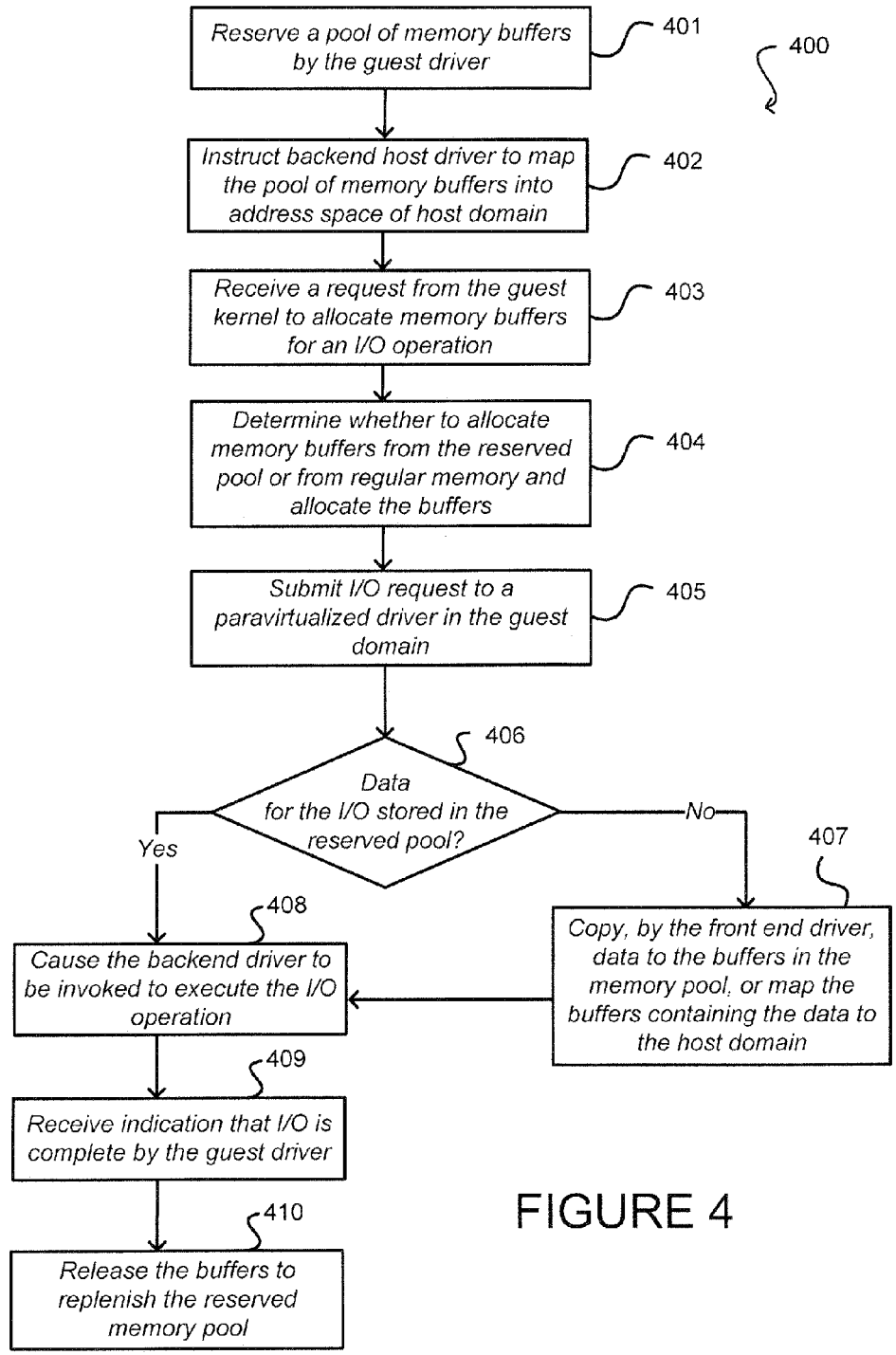
FIG. 4 illustrates an example process for reserving a pool of memory buffers and utilizing the reserved pool for performing I/O operations by a guest domain driver, in accordance with various embodiments.

FIG. 4 illustrates an example process 400 for reserving a pool of memory buffers and utilizing the reserved pool for performing I/O operations by a guest domain driver, in accordance with various embodiments.

In operation 401, the guest domain reserves a pool of memory for performing I/O operations. In accordance with an embodiment, this is performed by the guest driver, upon initialization, invoking the hypervisor and requesting the hypervisor to make the pool of memory available to the host device driver. In one embodiment, the reserved pool is associated with a particular device. Alternatively, the pool may be associated with the guest domain or multiple device instances.

In operation 402, the guest domain instructs or otherwise causes the host domain to map the reserved pool of buffers into its own memory address space. In one embodiment, upon initializing the host domain driver, the host domain may invoke the hypervisor and request the hypervisor to create static mappings of the physical memory associated with the pool into the virtual address space of the host domain. Once this mapping is performed, the host domain will have static mapping of the pool to its own address space and therefore will not need to perform any mapping, unmapping or TLB flush operations to gain access to the memory buffers of the reserved pool.

In operation 403, the guest kernel requests the memory management system to allocate a set of memory buffers for the I/O operation. For example, the guest kernel I/O stack can request buffers that will be allocated to the I/O operation. At that time, the guest kernel can also provide hints regarding which device type the I/O operation is destined to (e.g. device type, major device number, minor device number, device object address, etc.).

In operation 404, the memory management system can determine whether to allocate the memory buffers from the reserved pool or from regular memory. This can be implemented by providing hooks into the memory management activities, where the hooks can be used to determine the type of device or other information for the I/O operation. In one embodiment, the memory management system uses the hints as well as its own internal rules to determine which pool to allocate the buffers from. For example, if the guest I/O stack indicates that the buffers are for a network packet, the internal rule may indicate that the memory buffers should come from the reserved pool associated with the Ethernet port device. Once the system makes the determination, it allocates the memory buffers from the pool to be used with the I/O operations.

In operation 405, an I/O request is submitted to the guest driver (e.g. paravirtualized driver). In various embodiments, the paravirtualized driver communicates with the backend host driver in order to perform the I/O operation.

In operation 406, when the guest driver receives the request, it can first check whether the memory buffers allocated to the I/O belong to the reserved pool of memory buffers allocated by the memory management layer. This check can either be performed by the guest driver actively checking information associated with the request, or by the memory system indicating to the guest kernel that the buffers are from the reserved memory pool. If the data for the I/O resides in the memory buffers from the reserved pool, the process continues to operation 408. Otherwise, if the memory buffers are not from the reserved memory pool, the process can continue to operation 407.

In operation 408, if the memory buffers allocated to the I/O are from the reserved pool, the guest driver can instruct the host device driver to perform the I/O operation using the statically mapped buffers in the reserved pool. In one embodiment, the host driver can skip all the usual memory mapping, unmapping and TLB flush operations that would usually be needed to gain access to the memory buffers that contain the data for the I/O operation.

In operation 407, if the memory buffers are not part of the reserved pool, the guest driver can either (a) copy the data into the reserved pool; or (b) carry out the usual mapping and unmapping operations to grant the host domain access to the memory buffers by invoking the appropriate hypervisor calls. In some embodiments, the copying operation may be faster than the memory management activities and it may be preferable to copy the data into the reserved pool rather than mapping and unmapping operations. In other embodiments, the system can weigh the potential trade off in estimated latency that would be introduced by the copy versus the memory management operations to determine which option to select. Once the data has been copied or mapped, the system can continue to step 408, where the I/O operation is performed.

In operation 409, the guest driver receives a notification from the host driver, indicating that the I/O operation was successfully completed. In step 410, the guest driver can then release the memory buffers to replenish the reserved memory pool for other I/O operations.

Figure 5:
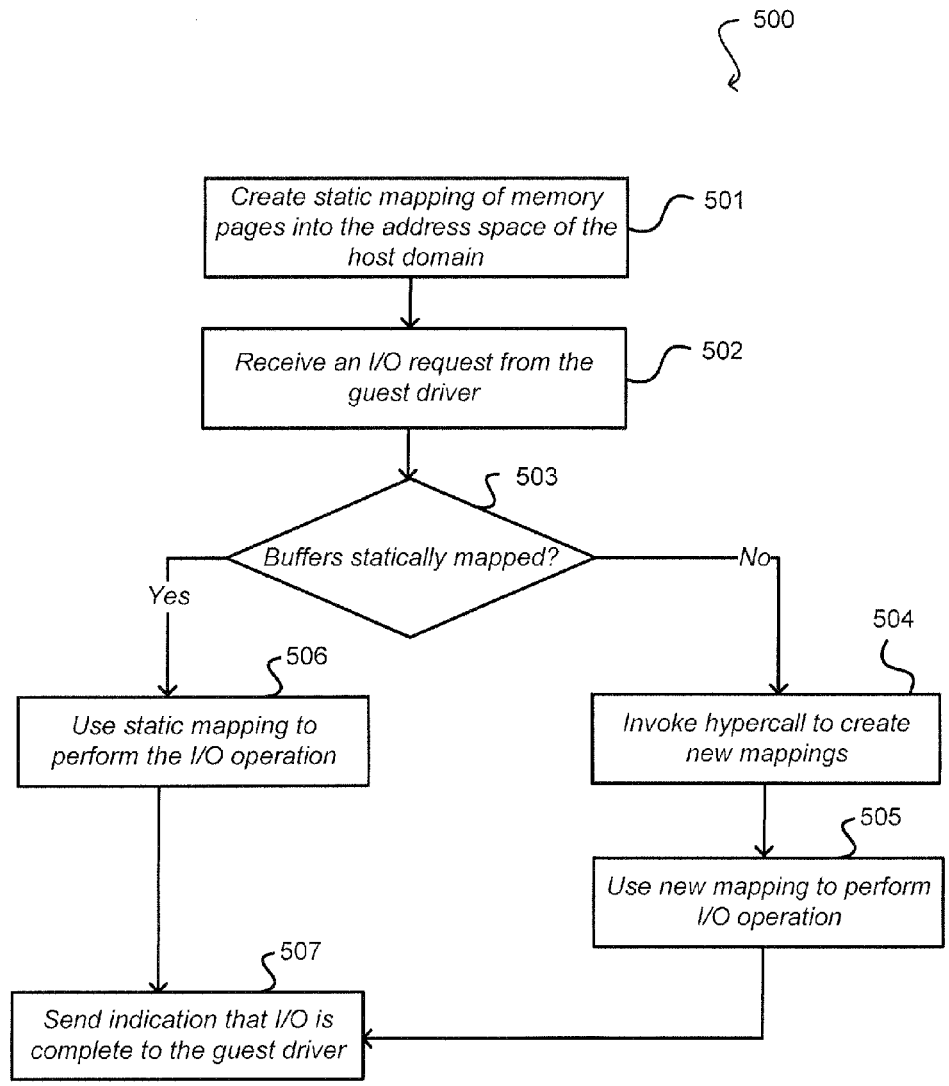
FIG. 5 illustrates an example process for utilizing a reserved pool of memory buffers for performing I/O operations by a host domain driver, in accordance with various embodiments.

FIG. 5 illustrates an example process 500 for utilizing a reserved pool of memory buffers for performing I/O operations by a host domain driver, in accordance with various embodiments.

In operation 501, during initial allocation, the backend (host) driver creates a static mapping of the memory pages that will be part of the reserved pool. Thereafter, the host driver may receive a request to perform an I/O operation from the guest driver, as shown in operation 502. When the host driver receives the request, the host driver first checks whether the buffers are part of the statically mapped pool in operation 503. If the memory buffers are part of the statically mapped pool, the host driver does not need to perform any further functions to gain access to the memory buffers and it can simply execute the I/O operation using the existing static mappings, as illustrated in operation 506. If, on the other hand, the memory buffers containing the data for the I/O are not part of the statically mapped pool, then the host driver invokes a regular hypercall to create the new mappings for the memory buffers, as shown in operation 504. Thereafter, the I/O operation can be performed using the new mappings (operation 505). Once the I/O is completed, the host driver can notify the guest driver, indicating that the I/O was successful, as shown in operation 507.

Figure 6:
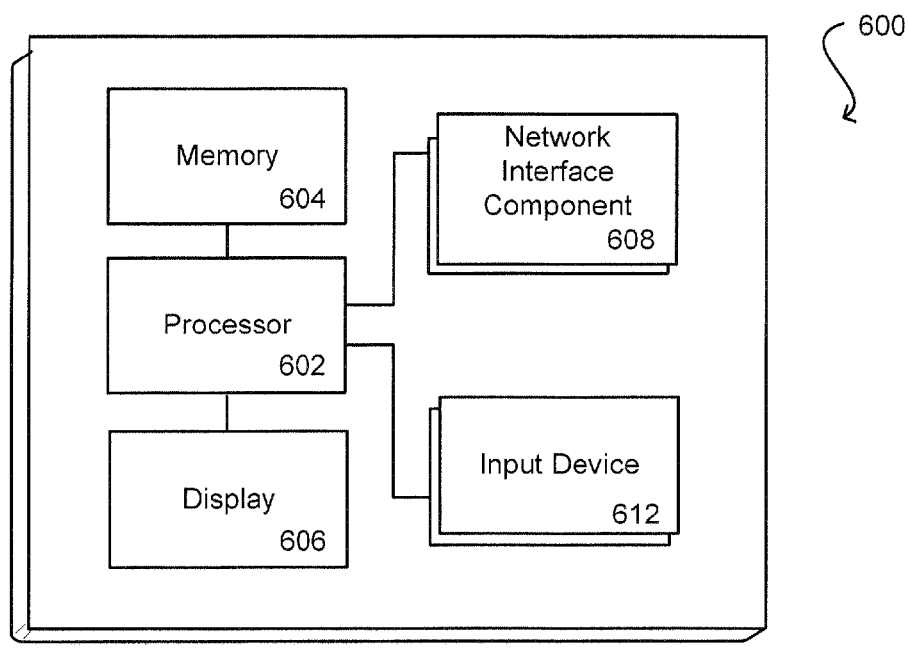
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
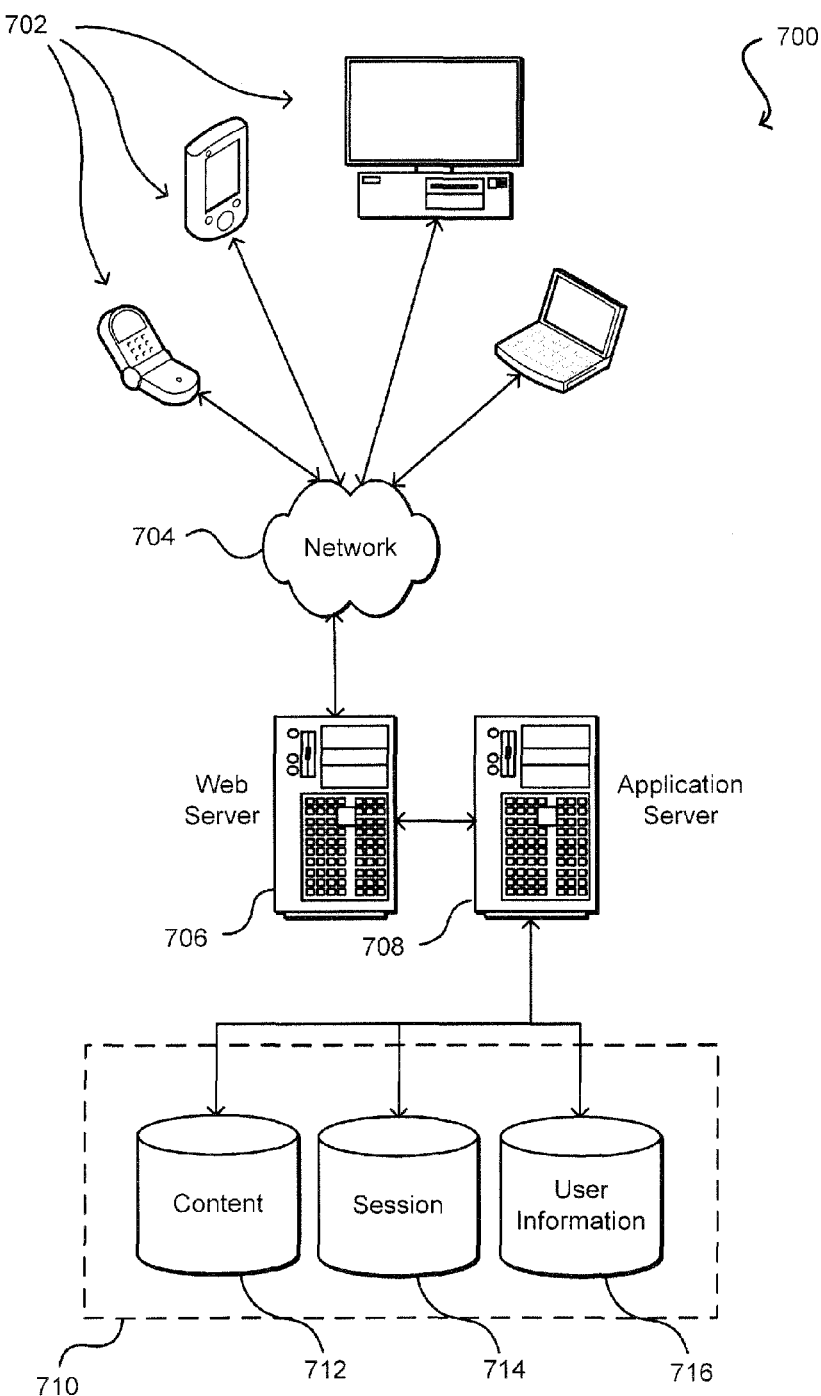
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for performing input/output (I/O) operations in a virtualized computing environment, said method comprising:
   under the control of one or more computer systems configured with executable instructions,
   allocating a pool of memory buffers for performing I/O operations for at least one device, the pool of memory buffers having static mappings into an address space of a guest domain and an address space of a host domain such that both the guest domain and the host domain are granted access to the pool of memory buffers;
   receiving, by a driver in the guest domain, a request to perform an I/O operation on the at least one device;
   determining whether one or more memory buffers that contain data for the I/O operation belong to the pool of memory buffers;
   if the one or more memory buffers belong to the pool, using the static mappings of the one or more memory buffers to read the data from the one or more memory buffers by a driver in the host domain and to perform the I/O operation by the driver in the host domain;
   if the one or more memory buffers do not belong to the pool, performing at least one of the following:
      causing the data contained in the one or more memory buffers to be copied into the pool of memory buffers; or
      causing new mappings into the address space of the host domain to be created for the one or more memory buffers.

2. The method of claim 1, wherein determining whether the one or more memory buffers that contain the data for the I/O operation belong to the pool of memory buffers is performed by the driver in the guest domain;
   wherein causing the data contained in the one or more memory buffers to be copied into the pool of memory buffers is performed by the driver in the guest domain; and
   wherein causing the new mappings into the address space of the host domain to be created for the one or more memory buffers is performed by a backend driver in the host domain.

3. The method of claim 1, further comprising:
   providing one or more hooks to a kernel memory allocation mechanism; and
   determining, based at least in part on the one or more hooks, whether to allocate the one or more memory buffers for the I/O operation from the pool or from a regular memory pool that does not contain the static mappings.

4. The method of claim 1, wherein statically allocating the pool of memory buffers further includes:
   upon initialization of a driver in the guest domain, requesting a hypervisor to provide a driver in the host domain access to the pool of memory buffers.

5. The method of claim 1, further comprising:
   receiving, by the guest domain, an indication that the I/O operation has been completed; and
   releasing the one or more memory buffers to replenish the pool of memory buffers.

6. A computer implemented method comprising:
   under the control of one or more computer systems configured with executable instructions,
   reserving a pool of memory buffers for performing input/output (I/O) operations on at least one device, the pool of memory buffers having static mappings that grant access to a guest domain and a host domain;
   receiving a request to perform an I/O operation;
   copying data for the I/O operation into one or more memory buffers in the reserved pool of memory buffers if the data for the I/O operation is not stored in the pool of memory buffers; and
   performing the I/O operation using the data accessed from the one or more memory buffers in the reserved pool.

7. The method of claim 6, wherein receiving the request for the I/O operation further includes:
   requesting, by the guest domain, one or more memory buffers for the I/O operation; and
   determining whether to allocate memory buffers from the reserved pool for the I/O operation based at least in part on one or more hooks into a memory management system, the one or more hooks used to indicate information associated with the at least one device.

8. The method of claim 6, further comprising:
   determining, by the guest domain, that the data for the I/O operation is stored in the reserved pool of memory buffers; and
   setting a flag in metadata passed in a ring buffer from the guest domain to the host domain, the flag indicating to the host domain that the data for the I/O operation is stored in the reserved pool of memory buffers.

9. The method of claim 6, wherein reserving the pool of memory buffers further includes:
   initializing a driver in the guest domain; and
   upon initialization, requesting, by the driver in the guest domain, a hypervisor to grant a driver in the host domain access to the pool of memory buffers.

10. The method of claim 6, further comprising:
    receiving, by the guest domain, an indication that the I/O operation has been completed; and
    releasing the one or more memory buffers to replenish the reserved pool of memory buffers.

11. The method of claim 6, further comprising:
    providing one or more memory management application programming interfaces (APIs) to enable an application to request that the one or more memory buffers be allocated from the reserved memory pool for the I/O operation.

12. The method of claim 6, further comprising:
    periodically remapping the reserved pool of memory buffers to change one or more physical addresses of the reserved pool.

13. A computer implemented method, comprising:
    under the control of one or more computer systems configured with executable instructions,
    creating, by a backend driver in a host domain, one or more static mappings to memory pages for communicating with a guest driver;

receiving, by the backend driver, a request to perform the I/O operation from the guest driver;

determining, by the backend driver, whether memory buffers associated with the I/O operation are part of the statically mapped memory pages; and if the memory buffers are part of the statically mapped memory pages, performing the I/O operation using the one or more static mappings by the backend driver; and if the memory buffers are not part of the statically mapped memory pages, creating one or more new mappings for the memory buffers.

14. The method of claim 13, further comprising:

completing the I/O operation by the backend driver in the host domain; and notifying the guest driver that the I/O operation has been completed.

15. A computing system, comprising:

at least one processor; and memory including instructions that, when executed by the processor, cause the computing system to:

reserve, by a guest driver in a guest domain, a pool of memory buffers for performing input/output (I/O) operations on at least one device, the pool of memory buffers having static mappings that grant access to the guest domain and a host domain;

receive a request to perform an I/O operation;

determine, by the guest driver, whether data for the I/O operation is in the reserved pool of memory buffers;

copy, by the guest driver, data for the I/O operation into one or more memory buffers of the reserved pool of memory buffers if the data for the I/O operation is not in the pool of memory buffers; and cause the I/O operation to be performed using the data accessed from the one or more memory buffers in the reserved pool by the guest driver.

16. The computing system of claim 15, wherein receiving the request for the I/O operation further includes:

requesting, by the guest domain, one or more memory buffers for the I/O operation; and determining whether to allocate memory buffers from the reserved pool for the I/O operation based at least in part on one or more hooks into a memory management system, the one or more hooks used to indicate information associated with the at least one device.

17. The computing system of claim 15, further comprising instructions that cause the computing system to:

determine, by the guest domain, that the data for the I/O operation is stored in the reserved pool of memory buffers; and set a flag in metadata passed in a ring buffer from the guest domain to the host domain, the flag indicating to the host domain that the data for the I/O operation is stored in the reserved pool of memory buffers.

18. The computing system of claim 15, wherein reserving the pool of memory buffers further includes:

initializing a driver in the guest domain; and upon initialization, requesting, by the driver in the guest domain, a hypervisor to grant a driver in the host domain access to the pool of memory buffers.

19. The computing system of claim 15, further comprising instructions that cause the computing system to:

receive, by the guest domain, an indication that the I/O operation has been completed; and release the one or more memory buffers to replenish the reserved pool of memory buffers.

20. The computing system of claim 15, further comprising instructions that cause the computing system to:

provide one or more memory management application programming interfaces (APIs) to enable an application to request that the one or more memory buffers be allocated from the reserved memory pool for the I/O operation.

21. A non-transitory computer readable storage medium storing one or more sequences of instructions executable by one or more processors to perform a set of operations comprising:

reserving, by a guest driver in a guest domain, a pool of memory buffers for performing input/output (I/O) operations on at least one device, the pool of memory buffers having static mappings that grant access to the guest domain and a host domain;

receiving a request to perform an I/O operation by the guest driver;

copying, by the guest driver, data for the I/O operation into one or more memory buffers in the reserved pool of memory buffers if the data for the I/O operation is not stored in the pool of memory buffers; and performing, by the guest driver, the I/O operation using the data accessed from the one or more memory buffers in the reserved pool.

22. The non-transitory computer readable storage medium of claim 21, wherein receiving the request for the I/O operation further includes:

requesting, by the guest domain, one or more memory buffers for the I/O operation; and determining whether to allocate memory buffers from the reserved pool for the I/O operation based at least in part on one or more hooks into a memory management system, the one or more hooks used to indicate information associated with the at least one device.

23. The non-transitory computer readable storage medium of claim 21, further comprising instructions for:

determining, by the guest domain, that the data for the I/O operation is stored in the reserved pool of memory buffers; and setting a flag in metadata passed in a ring buffer from the guest domain to the host domain, the flag indicating to the host domain that the data for the I/O operation is stored in the reserved pool of memory buffers.

24. The non-transitory computer readable storage medium of claim 21, wherein reserving the pool of memory buffers further includes:

initializing a driver in the guest domain; and upon initialization, requesting, by the driver in the guest domain, a hypervisor to grant a driver in the host domain access to the pool of memory buffers.

25. The non-transitory computer readable storage medium of claim 21, further comprising instructions for:

receiving, by the guest domain, an indication that the I/O operation has been completed; and releasing the one or more memory buffers to replenish the reserved pool of memory buffers.

26. The non-transitory computer readable storage medium of claim 21, further comprising instructions for:

providing one or more memory management application programming interfaces (APIs) to enable an application to request that the one or more memory buffers be allocated from the reserved memory pool for the I/O operation.

* * * * *